May 14, 1929. G. W. BLAIR 1,712,976
FASTENER
Filed March 5, 1924
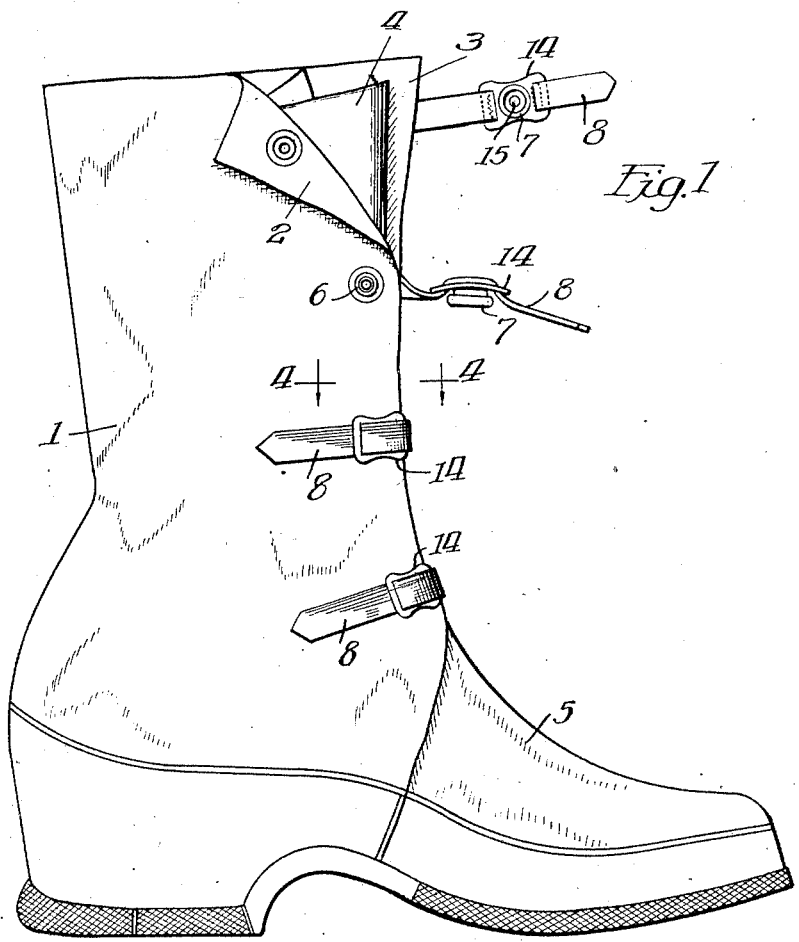
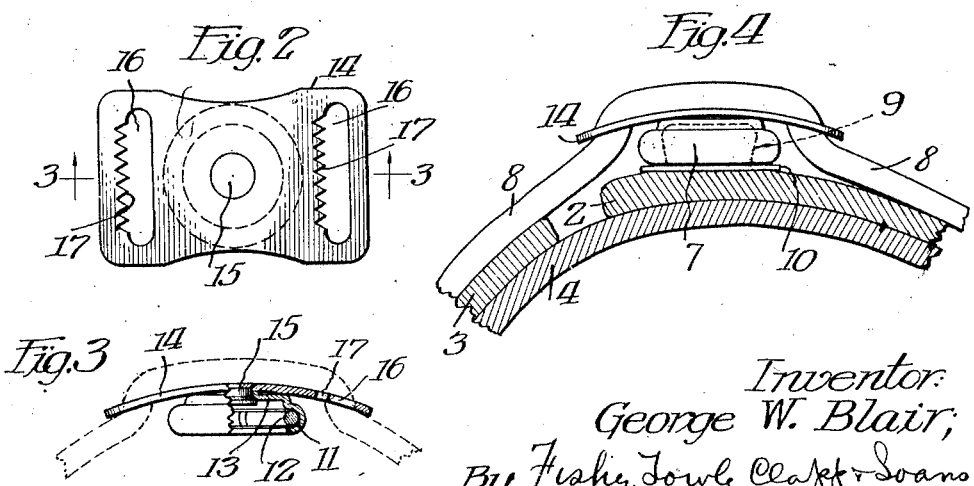
Inventor:
George W. Blair,
By Fisher, Towle, Clapp & Soans
Attys.

Patented May 14, 1929.

1,712,976

UNITED STATES PATENT OFFICE.

GEORGE W. BLAIR, OF MISHAWAKA, INDIANA, ASSIGNOR TO MISHAWAKA RUBBER & WOOLEN MANUFACTURING COMPANY, OF MISHAWAKA, INDIANA, A CORPORATION OF INDIANA.

FASTENER.

Application filed March 5, 1924. Serial No. 696,927.

My invention has reference more particularly to fasteners for detachably connecting the two side portions of the upper part of the overshoe.

In overshoes or arctics such as are now commonly worn, the upper is arranged to be spread apart so that the foot may be readily inserted and removed, and it is customary to provide a number of detachable fasteners for connecting the separable side portions of the upper at suitable intervals to hold the overshoe snugly in place on the foot. These fasteners are usually in the form of hinged tongues on the one side which engage plates on the other side, said plates being provided with a number of slots in which the tongue may be optionally inserted so that the edges of the overshoe may be drawn more or less closely together. With this construction however, the fastener is not only unsightly but also the extent of adjustment afforded is in many cases insufficient.

The principal objects of my invention are to provide an improved fastener which enhances the appearance of the overshoe; to afford a wide range of adjustment whereby the size of the upper part of the overshoe may be varied to any desired extent; to construct the fastener in a neat compact form so that it does not project to any material extent from the surface of the overshoe; to permit covering of the fastener with the material of the overshoe, so that very little of the metal parts are exposed; and in general, to provide a simple and inexpensive fastener for overshoes which is more convenient than those heretofore provided.

On the drawings:

Fig. 1 is a side view of an overshoe with my fasteners applied thereto, and showing two of the fasteners in the fastening position and two of the fasteners turned back;

Fig. 2 an enlarged top view of the outer part of the portion of the fastener which is attached to the strap;

Fig. 3 a side view thereof, taken partly in section on the line 3—3 of Fig. 2; and Fig. 4 a fragmentary sectional view on the line 4—4 of Fig. 1.

Referring to the drawings, the reference numeral 1 indicates as a whole an overshoe or arctic, the upper of which is divided at the front to permit separation of the two side portions 2 and 3 of the upper. A tongue or flap 4, which forms a continuation of the vamp 5, is preferably interposed between the portions 2 and 3 and secured thereto near the edges in any suitable manner, with a fold at each side permitting the front edges of the side portions 2 and 3 to be readily spread apart. A series of snap fastener members 6 are secured at intervals along the forward edge of the side portion 2 and adapted to be engaged by complementary snap fastener members 7 on straps 8, which are correspondingly arranged at intervals along the edge of the other side portion 3 of the upper. The snap fastener members 6 and 7 are of any suitable form, the former preferably consisting of a stud or shell, enlarged at the outer extremity as indicated at 9, and provided with a flange 10 at the base and is secured to the material of the upper in the usual manner.

The other fastener member comprises a cup-shaped shell which is expanded around the upper end to form an annular internal groove 11, in which is seated a split spring ring 12, which yields radially and slips over the enlarged end of the fastener 6 and thereby interlocks the two parts of the fastener. The base of the member 7 is flat as indicated at 13, and has an elongated plate 14 secured to the outer face thereof in any convenient manner, as for example, by the rivet 15, and this plate 14 has slots 16 at the ends through which the strap 8 is passed.

The edges of the slots 16 at the side upon which pull is exerted by the strap 8 are preferably serrated or provided with teeth as indicated at 17, which serve to engage the strap 8 and hold the fastener against displacement thereon. The fastener 7 is applied to the strap 8 by inserting the end of the latter up through one of the slots 16 over the top of the plate 14 and then down through the other slot 16, and obviously the fastener 7 may be readily adjusted along the strap 8 to any desired position.

The combined fastener 7 and plate 14 is arranged in as flat a form as possible, preferably without any parts projecting above the plate 14 so that the strap 8 fits smoothly against the outer face of the plate 14, and as the outer face of the plate is almost entirely covered by the strap 8, the fastener presents a neat compact appearance, and very little metal of the fastener is exposed.

With this construction the overshoe may be readily adjusted to suit the wearer by adjusting the fasteners 7 along the strap 8, and the overshoe may be readily fastened by merely pressing the fasteners 7 down into engagement with the studs 6 and may be removed by merely pulling up on the strap 8.

While I have shown and described my invention in a preferred form, I am aware that various changes and modifications may be made without departing from the principles of my invention, the scope of which is to be determined by the appended claim.

I claim as my invention:

As a new article of manufacture, an adjustable member of a quick detachable snap fastener, comprising a plate having terminal transverse slots and a snap fastener socket disposed entirely upon the inner side of the plate between the slots and riveted thereto, the plate between the slots being continuous and the outer side of the plate being unobstructed, said plate and socket each being provided with a hole for the passage of the rivet.

GEORGE W. BLAIR.